(12) United States Patent
Storhok et al.

(10) Patent No.: US 8,132,400 B2
(45) Date of Patent: Mar. 13, 2012

(54) CONTROLLED AIR-FUEL RATIO MODULATION DURING CATALYST WARM UP BASED ON UNIVERSAL EXHAUST GAS OXYGEN SENSOR INPUT

(75) Inventors: Eric Storhok, Ann Arbor, MI (US); James Kerns, Trenton, MI (US); Imad Makki, Dearborn Heights, MI (US); Ed Schoenberg, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1432 days.

(21) Appl. No.: 11/297,155

(22) Filed: Dec. 7, 2005

(65) Prior Publication Data
US 2007/0125070 A1   Jun. 7, 2007

(51) Int. Cl.
*F01N 3/00* (2006.01)

(52) U.S. Cl. ............... 60/285; 60/274; 60/276; 60/284

(58) Field of Classification Search .................... 60/274, 60/276, 284, 285, 286; 701/103, 104, 109
See application file for complete search history.

(56) References Cited

U.S. PATENT DOCUMENTS

| | | | |
|---|---|---|---|
| 5,483,946 A | | 1/1996 | Hamburg et al. |
| 5,582,150 A | * | 12/1996 | Reed et al. ............... 123/406.47 |
| 5,839,415 A | * | 11/1998 | Suzuki et al. .................. 123/491 |
| 5,974,785 A | * | 11/1999 | Cunningham et al. .......... 60/274 |
| 6,035,839 A | | 3/2000 | Ohtani et al. |
| 6,188,953 B1 | * | 2/2001 | Yasui et al. .................... 701/109 |
| 6,298,840 B1 | * | 10/2001 | Kerns ............................ 123/681 |
| 6,567,738 B2 | * | 5/2003 | Gopp et al. .................... 701/109 |
| 6,978,203 B2 | * | 12/2005 | Yasui et al. .................... 701/101 |
| 7,047,728 B2 | * | 5/2006 | Yasui ............................. 60/285 |
| 7,426,926 B2 | * | 9/2008 | Husak et al. .................. 123/674 |

* cited by examiner

*Primary Examiner* — Tu Nguyen
(74) *Attorney, Agent, or Firm* — Julia Voutyras; Alleman, Hall, McCoy, Russell & Tuttle LLP (57) ABSTRACT

An emissions control system for a vehicle configured to travel on a road is provided. In one example, a forced modulation of a UEGO is provided when output of a HEGO sensor is unavailable. The system may improve catalyst efficiency

22 Claims, 10 Drawing Sheets

CONTROLLED AIR-FUEL RATIO MODULATION DURING CATALYST WARM UP BASED ON UNIVERSAL EXHAUST GAS OXYGEN SENSOR INPUT

BACKGROUND

Internal combustion engines utilize feedback from Exhaust Gas Oxygen (EGO) sensors to maintain desired air-fuel ratio mixtures during combustion, at least under some conditions. Various types of EGO sensors may be used, such as linear type sensors, sometimes referred to as Universal Exhaust Gas Oxygen (UEGO) sensors, and switching type sensors such as Heated Exhaust Gas Oxygen (HEGO) and Exhaust Gas Oxygen (EGO) sensors, depending on whether a heater is included.

In internal combustion engines equipped with an exhaust catalyst to reduce undesirable emissions, it has been found that modulation of the air-fuel ratio to rich and lean of stoichiometric conditions may improve efficiency of the catalyst under some conditions. One application of EGO sensors is to provide feedback upon which air-fuel ratios may be modulated. One prior approach involved modulating the air-fuel ratio using feedback from a Catalyst Monitor Sensor (CMS) such as a HEGO sensor to identify the stoichiometric conditions around which modulation was to take place. However, during warm up of the catalyst, the modulation controller is unable to use the HEGO CMS for feedback. As a result, during warm up the catalyst may operate at a less than desired efficiency.

It is also known that while an internal combustion engine warms up, both the constituent emissions from the engine as well as the catalyst efficiency toward these various constituent emissions change over time. One problem that occurs is that the catalyst can sometimes become saturated with a particular constituent during warm-up and early stable engine operation. As a result, the engine and catalyst system may operate at a less than desired efficiency during warm up and early stable engine operation.

SUMMARY

The inventors have recognized that under catalyst warm up conditions it would be advantageous to modulate the air-fuel ratio in a controlled manner to improve performance of the catalyst system. The inventors have overcome the drawbacks of the prior art systems which required HEGO CMS feedback for controlled modulation about stoichiometry, by conceiving of systems and methods for controlling air-fuel modulation, which simulate the operation of a normal HEGO sensor. As a result, even during catalyst warm up, the air-fuel mixture may be modulated about stoichiometry to increase the catalyst system efficiency.

An emissions control system for a vehicle configured to travel on a road is disclosed that address the above discussed problems associated with the prior art and provides the above potential advantages. The system typically includes a catalyst coupled to the exhaust gas path, a linear universal exhaust gas oxygen (UEGO) sensor coupled to the exhaust gas path upstream of the catalyst and configured to measure oxygen content in exhaust gas from the engine upstream of the catalyst, and a heated exhaust gas oxygen (HEGO) sensor positioned adjacent the catalyst and configured to measure oxygen content in exhaust gas from the engine. The system further typically includes a controller coupled to the engine and configured to, during a warm up period of the catalyst during which input from the HEGO sensor is unavailable, adjust an engine air-fuel ratio of the engine in response to the input from the UEGO sensor, and further configured to provide modulation of said air-fuel ratio during the warm up period so that the air-fuel ratio of the engine oscillates about a selected target ratio.

In this way, it may be possible to achieve improved efficiency by providing air-fuel modulation even when the HEGO sensor is inactive.

The inventors have also recognized that the HEGO sensor signal may be adjusted, for example trimmed, during engine warm up based on a measured warm-up temperature and/or air mass, to adjust the air-fuel control to compensate for the effect that engine warm up has on the efficiency of the engine catalyst system. The measured temperature may be, for example, an engine coolant temperature or a catalyst temperature. As a result, the tailpipe emissions during both engine warm up and early stable running of a vehicle may be better managed, and saturation of the catalyst with a particular constituent may be inhibited.

An emissions control system for an on-road vehicle having an engine and associated exhaust gas path is disclosed that addresses the above discussed problems associated with the prior art and provides the above potential advantages. The system typically includes a catalyst coupled to the exhaust gas path; a linear universal exhaust gas oxygen (UEGO) sensor coupled to the exhaust gas path upstream of the catalyst and configured to measure oxygen content in exhaust gas from the engine upstream of the catalyst; a heated exhaust gas oxygen (HEGO) sensor positioned adjacent the catalyst and configured to measure oxygen content in exhaust gas from the engine; a temperature sensor coupled to the engine; and a controller coupled to the engine and configured to receive an input signal from the HEGO sensor that is indicative of oxygen content in the exhaust gas, to receive an input signal from the temperature sensor, to adjust the HEGO sensor input signal based on the input signal from the temperature sensor, and to control the air-fuel ratio based on the adjusted HEGO sensor input during engine warm up. The temperature sensor may be an engine coolant temperature sensor, exhaust temperature sensor, or other suitable temperature sensor configured to measure a temperature of the engine.

In this way, it may be possible to achieve improved efficiency by adjusting the HEGO sensor input signal based on engine temperature, and controlling the air-fuel ratio based on the adjusted HEGO sensor input signal.

DETAILED DESCRIPTION OF EXAMPLE EMBODIMENT(S)

Figure 1:
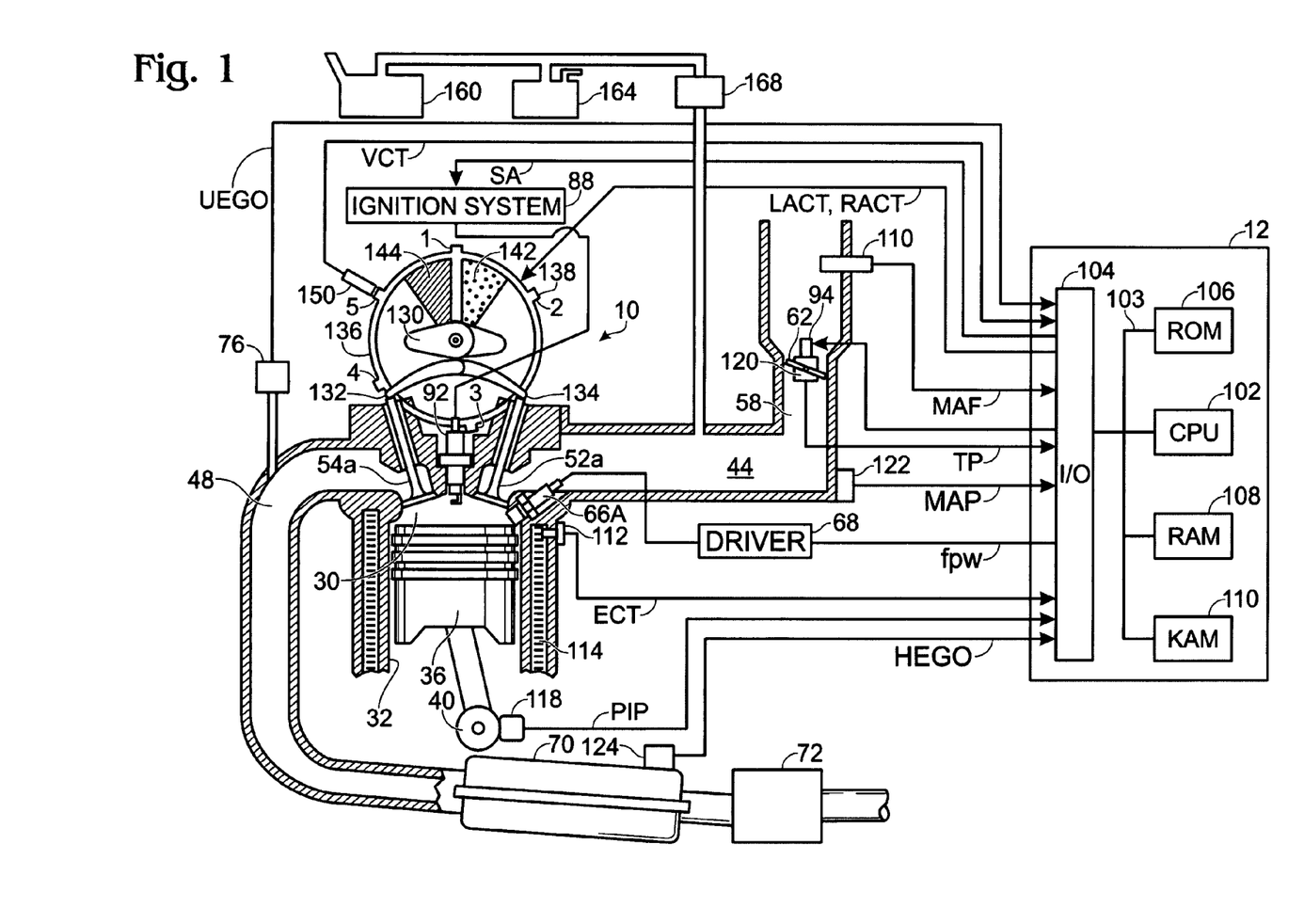
FIGS. 1 and 2 are partial cutaway away views of engines according to exemplary embodiments of the present invention.
Figure 2:
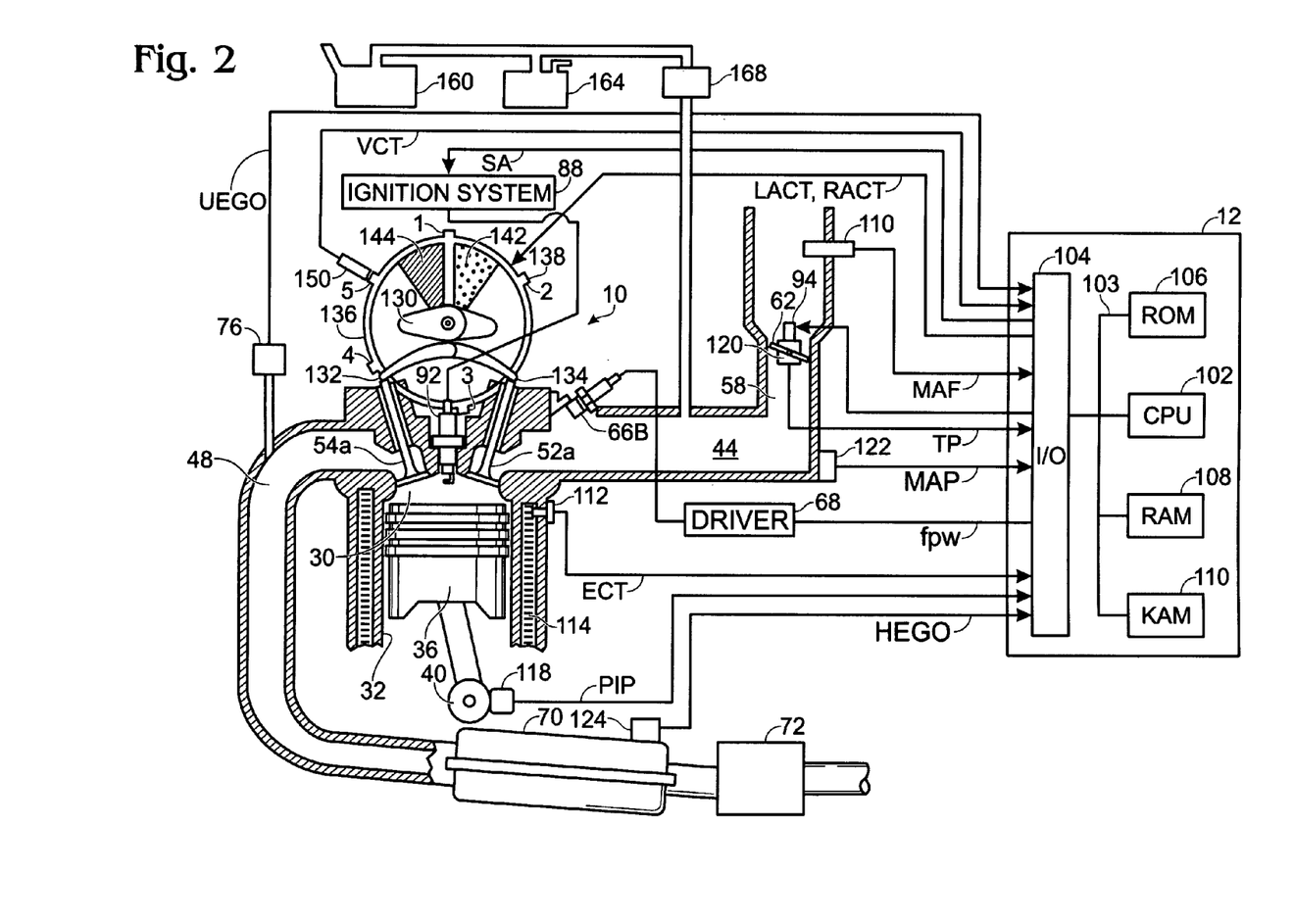

FIGS. 1 and 2 show different embodiments of an internal combustion engine 10 for use in an on-road passenger vehicle. While one cylinder, as well as an intake path, exhaust path connected to that cylinder, are illustrated, it will be appreciated that the depicted engines typically include four, six, eight, ten, or more cylinders, and may be of inline or V configurations.

In FIG. 1, a direct injection spark ignited internal combustion engine 10 is shown, which includes a plurality of combustion chambers, and is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown fluidically communicating with intake manifold 44 and exhaust manifold 48 via respective intake valves 52a and exhaust valves 54a. Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high pressure fuel system including fuel tank 160, fuel vapor storage canister 164, purge control valve 168, and associated fuel pumps and fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is typically a linear or universal exhaust gas oxygen (UEGO) sensor and is shown coupled to exhaust manifold 48 upstream of catalytic converter 70. Exhaust gas sensor 76 outputs a signal UEGO that is used by air-fuel controller 300, described below.

Conventional distributorless ignition system 88 provides ignition spark to combustion chamber 30 via spark plug 92 in response to spark advance signal SA from controller 12. Controller 12 causes combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contain a stoichiometric mixture or a mixture slightly rich of stoichiometry, and subsequent strata contain progressively leaner mixtures. During the homogeneous mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is also possible.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode. Such operation occurs during a NOx purge cycle when it is desired to purge stored NOx from NOx trap 72, or during a vapor purge cycle to recover fuel vapors, or during operating modes requiring more engine power, or during operation modes regulating temperature of the omission control devices such as catalyst 70 or NOx trap 72.

Controller 12 typically includes a processing unit 102, and a data bus 103 linking the processing unit to input/output ports 104 and associated memory. The memory typically includes non-volatile memory for storing executable programs, calibration values, etc., such as read only memory 106 and keep alive memory 110, as well as volatile memory such as random access memory 108, which may be used by processing unit 102 during execution of stored programs.

Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal (MAP) from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

A heated exhaust gas oxygen (HEGO) sensor 124 is typically provided adjacent catalyst 70. The HEGO sensor is configured to measure oxygen content in exhaust gas from the engine and send a HEGO signal indicative of this oxygen content to the controller 12. Alternatively, it will be appreciated that the HEGO sensor may be positioned elsewhere downstream of the catalyst, such as intermediate catalyst 70 and emission control device 72 (which can be a NOx trap), or adjacent the emission control device 72.

Continuing with FIG. 1, camshaft 130 of engine 10 is shown communicating with rocker arms 132 and 134 for actuating intake valves 52a, 52b and exhaust valve 54a, 54b. Camshaft 130 is directly coupled to housing 136. Housing 136 forms a toothed wheel having a plurality of teeth 138, numbered 1-5. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allows for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Referring now to FIG. 2, a port fuel injection configuration is shown where fuel injector 66B is coupled to intake manifold 44, rather than directly cylinder 30.

As described above, it will be appreciated that FIGS. 1A and 1B merely show one cylinder of a multi-cylinder engine, and that each cylinder has its own set of intake/exhaust valves, fuel injectors, spark plugs, etc. The multi-cylinder engine may, for example, be of an inline or V configuration, and may include four, six, eight, ten or other number of cylinders. Further, it will be appreciated that the engines shown in FIGS. 1A and 1B are typically mounted within a vehicle chassis to a drive train that includes a transmission for transmitting power to the driven wheels.

Also, in the example embodiments described herein, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air-fuel ratio. Typically, following warm up of the engine, the air-fuel ratio is modulated based on feedback from HEGO sensor 124, which provides an accurate measure of the air-fuel ratio. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used, if desired.

Also note that various methods can be used to maintain the desired torque such as, for example, adjusting ignition timing, throttle position, variable cam timing position, exhaust gas recirculation amount, and a number of cylinders carrying out combustion. Further, these variables can be individually adjusted for each cylinder to maintain cylinder balance among all the cylinder groups.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

Figure 3:
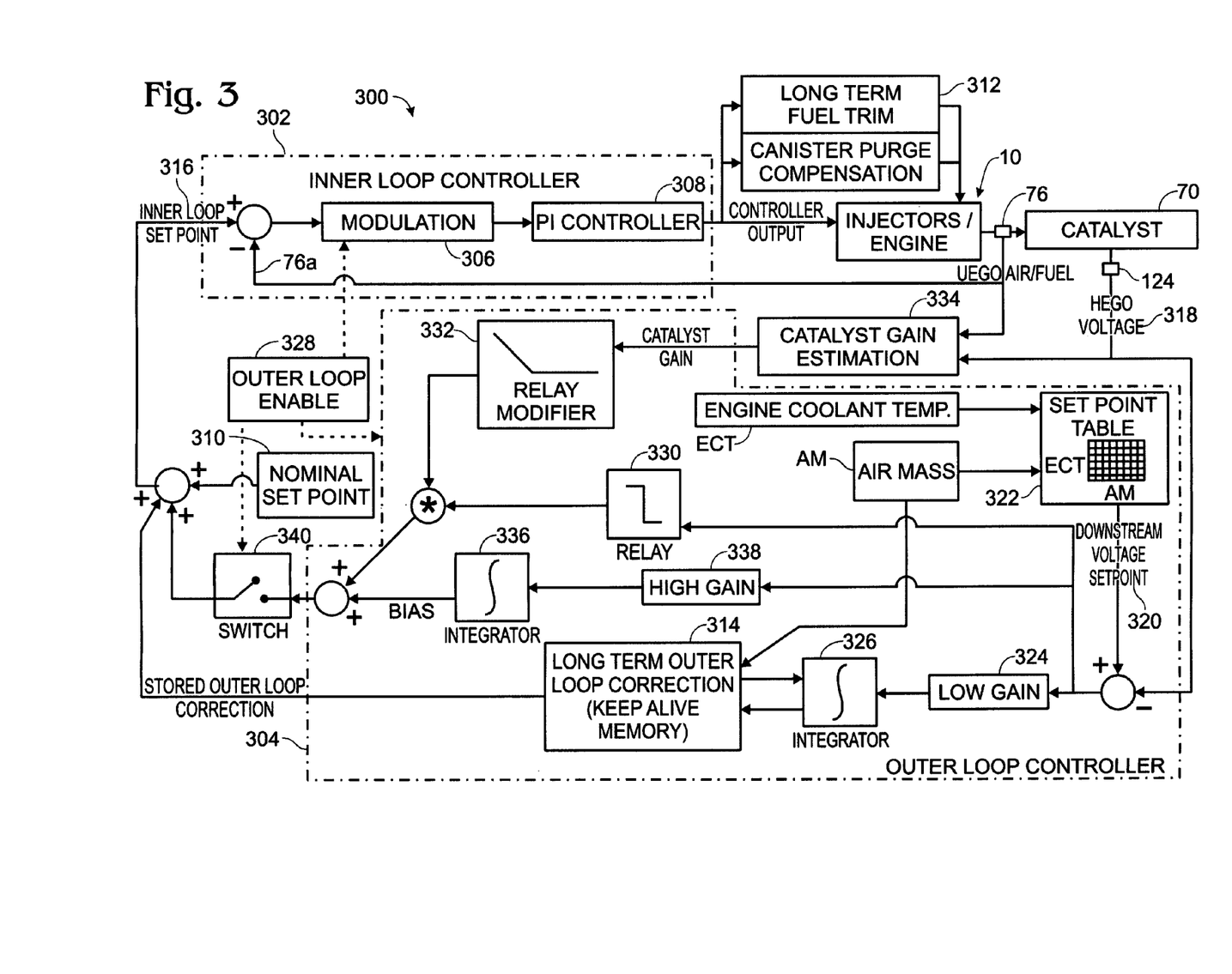
FIG. 3 is a schematic view of an air-fuel controller for the engines of FIGS. 1A and 1B.

Referring now to FIG. 3, an air-fuel controller for controlling the air-fuel ratio in the engine of an on-road vehicle is shown generally at 300. Typically, air-fuel controller 300 is logically implemented by electronic engine controller 12. Air-fuel controller 300 typically includes an inner loop controller (also referred to as an upstream control module) 302 and an outer loop controller (also referred to as a downstream control module) 304, which together are configured to control the air-fuel ratio of the engine 10 by determining a target air-fuel ratio and sending a command signal to the injectors and engine to produce the target air-fuel ratio.

Inner loop controller 302 receives feedback from the linear or universal exhaust gas oxygen (UEGO) sensor 76 that is coupled to the exhaust gas path upstream of the catalyst 70 and configured to measure oxygen content in exhaust gas from the engine upstream of the catalyst. Outer loop controller also receives feedback from the UEGO sensor 76, as well as from a heated exhaust gas oxygen (HEGO) sensor 124 positioned adjacent the catalyst 70 and configured to measure oxygen content in exhaust gas from the engine. During normal, warmed-up operation of the engine and catalyst, the inner loop controller 302 and the outer loop controller 304 work together to control the air-fuel ratio in a manner so as to both exhibit bias and modulation about a target air-fuel ratio, and to vary the target air-fuel ratio based on long-term variations in operating conditions of the vehicle as well as short term corrections in air-fuel error based feedback from the UEGO sensor.

The inner loop takes as its input a nominal set point 310. The nominal set point 310 is typically set slightly lean of stoichiometric, and is a function of temperatures and vehicle operating conditions such as speed, load, etc. To this nominal set point 310, air-fuel corrections may be applied, such as corrections that are learned during previous vehicle operation, and stored in non-volatile memory, such keep alive memory 110.

There are typically two long-term correction terms that are stored in keep alive memory 110 and used by the air-fuel controller 300 to control air-fuel ratio. The first is inner loop long term fuel trim 312, which corrects for errors in the air-fuel metering system that may arise from variations in injector flow and air mass measurement, vacuum leaks, pressure control valve (PCV) fluctuations, etc. The second term is an outer loop long-term correction 314 that corrects for errors in the UEGO-measured air-fuel ratio. The outer loop long-term correction 314 typically is added to the nominal set point 310 to arrive at a resultant inner loop set point 316. It will be appreciated that typically the downstream HEGO sensor 124 provides the most accurate measure of air-fuel ratio at stoichiometry.

To generate the outer loop long term correction term 314, the outer loop controller 304 receives HEGO voltage 318 as input from the HEGO sensor 124 and subtracts it from a downstream voltage set point 320, to thereby determine a downstream error voltage. According to one embodiment, to determine the downstream voltage set point 320, engine coolant temperature (ECT) and air mass (AM) values are received from engine sensors and input into a look up table, set point table 322, which relates downstream voltage set point values to measured engine coolant temperature (ECT) and air mass (AM). Upon the input of AM and ECT values to the look-up table, the appropriate downstream voltage set point value is output from the look-up table.

According to another embodiment, the ECT value and AM value may be used by the controller to determine an inferred catalyst temperature. This inferred catalyst temperature may also be based on factors such as measured engine speed, measured intake air temperature, and measured air fuel ratio. A time value may also be applied to account for the distance of a particular catalyst from the exhaust port of the engine. The controller may be configured to input measured ECT, AM, engine speed, spark advance, intake air temperature, and air fuel ratio, as well as a time value, into a calculation mechanism that is configured to output an inferred catalyst temperature based on these inputs. In turn, a look up table or other calculation mechanism may be provided that relates an inferred catalyst temperature to a downstream voltage set point.

While ECT values obtained from the engine coolant temperature sensor are typically used in the above embodiments, it will be appreciated that other types of temperature sensors may be employed, such as an exhaust temperature sensor placed in the exhaust path and configured to directly measure the temperature of exhaust gases. In this case, the downstream voltage set point may be calculated directly from the measured exhaust temperature, for example by using a look up table that relates measured (actual) exhaust temperatures to downstream set point values.

After subtracting the HEGO voltage 318 from the downstream voltage set point, the resulting downstream error voltage is passed through a low gain amplifier 324 and an integrator 326, which updates the long-term outer loop correction term 314. The long term correction term 314 is typically determined from a look up table as a function of air mass, and stored keep alive memory.

In addition to applying long-term corrections to the nominal air-fuel set point 310 via the inner and outer loops 302, 304, the air-fuel controller 300 may be configured to modulate the air-fuel ratio, which in turn may improve performance of the catalyst. During normal operation following warm-up of the engine 10 and catalyst 70, outer loop enable 328 is typically set to ON, and relay 330 and associated relay modifier 332 provide a correction term that modulates the air-fuel ratio, taking into account catalyst gain estimation 334 based on UEGO and HEGO output. If the downstream voltage error is positive, the relay 330 outputs a low value, otherwise it outputs a high value. The relay modifier 332 receives the estimated catalyst gain 334 and performs a calculation, or look-up using an associated look-up table, to thereby determine a modifier value. The output of the relay 330 is typically multiplied by the modifier voltage output from the relay modifier 332.

After multiplication, the result is combined with a bias voltage that is generated by integrator 336 and high gain amplifier 338. The downstream error voltage is passed through high gain amplifier 338 and integrator 336, to produce the bias voltage. Provided outer loop enable 328 is set to ON and switch 340 is thus closed, these modulation and bias terms are added to the nominal set point 310 and stored outer loop correction term 314, to produce an inner loop set point 316 that is biased and oscillates over time.

However, following engine startup the HEGO sensor undergoes a period of warm up during which the HEGO sensor is inactive. During this period, the outer loop 304 cannot provide controlled modulation of the air-fuel ratio. To compensate, the inner loop controller 302 includes a modulation source 306 and a proportional integral (PI) controller 308, which function together to modulate the air-fuel ratio of the engine about a target air-fuel ratio calculated from feedback from the UEGO sensor 76, which is looped back into the inner loop controller 302. Following engine startup the upstream UEGO sensor will be warmed up and active before the downstream HEGO sensor is warm and active. Thus, during the warm up period of the catalyst during which input from the HEGO sensor is unavailable, the air-fuel controller 300 may be configured to adjust an engine air-fuel ratio of the engine in response to the input from the UEGO sensor, and further configured to provide modulation of said air-fuel ratio during the warm up period so that the air-fuel ratio of the engine oscillates about a selected target ratio.

Figure 4:
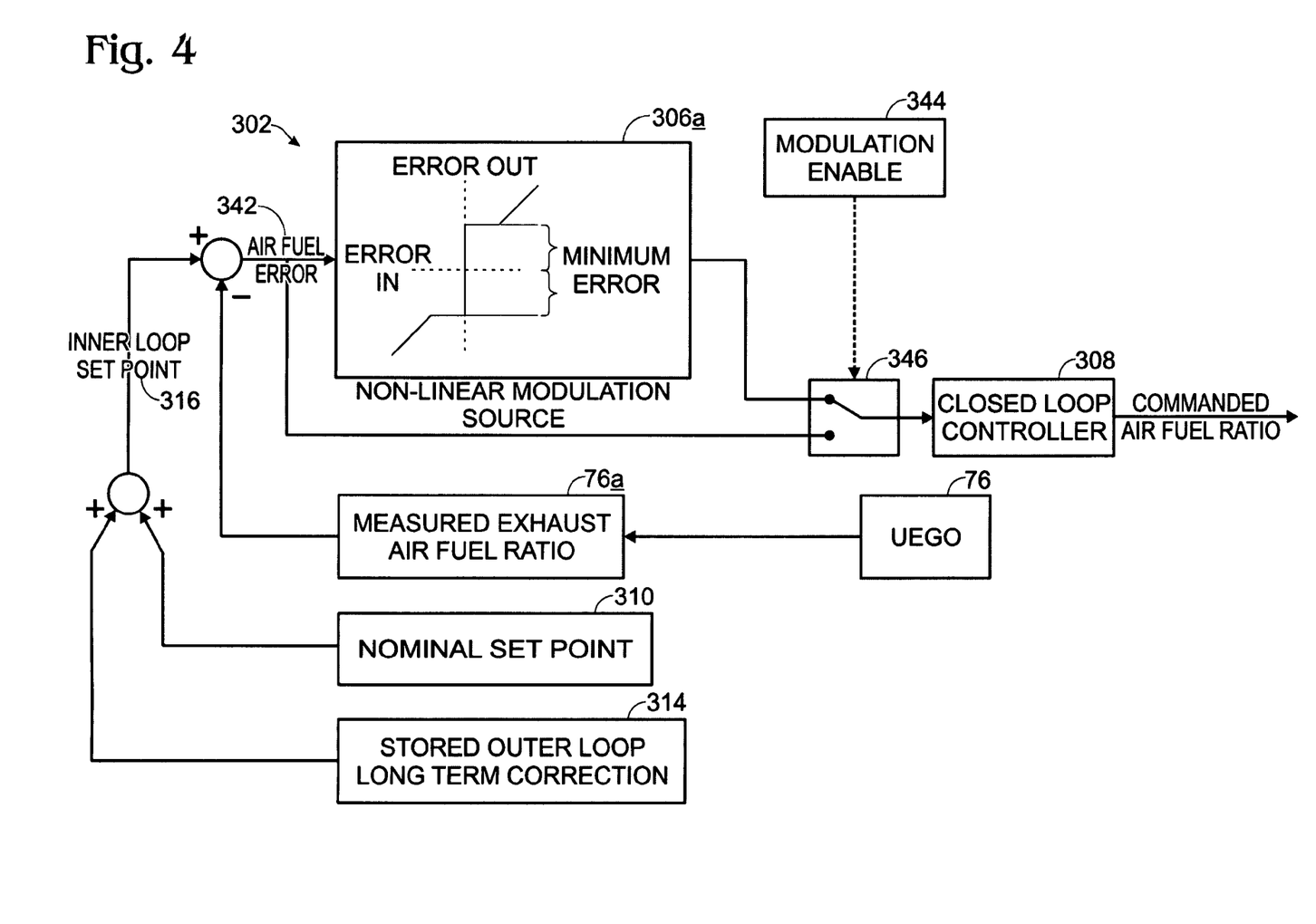
FIG. 4 is a schematic view of the air-fuel controller of FIG. 3, configured to implement a non-linear control algorithm as a modulation source for modulating the air-fuel ratio of the engine during catalyst warm up.
Figure 5:
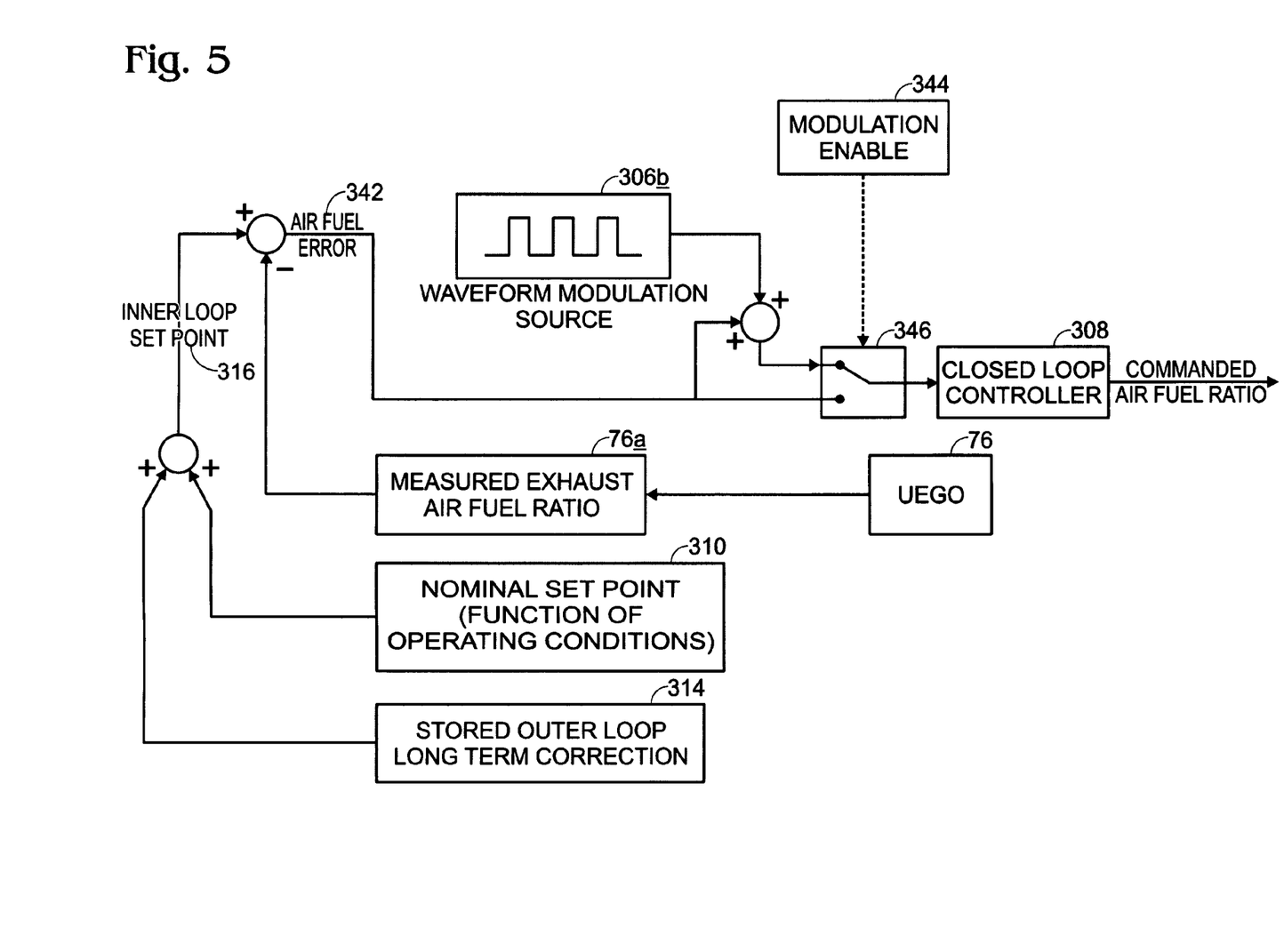
FIG. 5 is a schematic view of the air-fuel controller of FIG. 3, configured to implement a square wave control algorithm as a modulation source for modulating the air-fuel ratio of the engine during catalyst warm up.

The modulation source 306 may be any of a variety of suitable modulation sources, including a non-linear control algorithm, as illustrated in FIG. 4, and a waveform control algorithm, as illustrated in FIG. 5. These alternative embodiments will be described in detail below.

Referring to FIG. 4, one exemplary control process that the modulation source may employ to provide modulation in the inner loop controller 302 is a non-linear control algorithm 306a that modifies an air-fuel error term 342 supplied to the PI controller 308 to create a minimum error. This algorithm is graphically represented in the figures and described in detail with respect to FIG. 6 below. Typically, the air-fuel error term 342 is set to the difference between the inner loop set point 316 and the measured exhaust gas air-fuel ratio 76a, as measured by the UEGO sensor 76.

Figure 10:
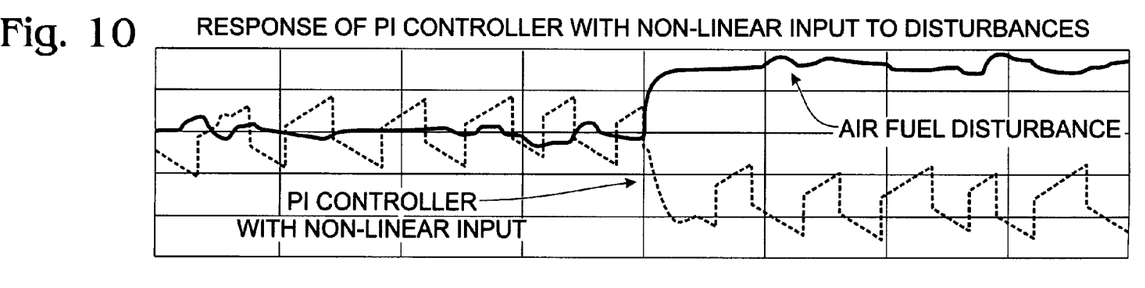
FIG. 10 is a graph illustrating an exemplary response of a PI controller with non-linear input to disturbances in the air-fuel ratio.

This minimum error forces the PI controller to output a jump/ramp waveform, as shown in FIG. 10. Provided the modulation enable term 344 is set to ON, switch 346 passes the output of the non-linear jump/ramp algorithm to PI controller 308. The step change in the error between the positive and negative minimum error causes a proportional control in the PI controller 308 to provide a jump, and having the minimum error causes the integrator control in the PI controller 308 to ramp up and down. The frequency of the modulation is a function of the delay between commanded air-fuel and the measured value at the UEGO sensor. The magnitude of the modulation is a function of the calibrated controller gains and the calibrated minimum error.

Use of the minimum error to generate a jump/ramp waveform may also be used as part of engine diagnostic tests implemented by the controller, for example, when it is necessary to determine whether the UEGO sensor is responding, by attempting to force a response in the measured air-fuel ratio.

Typically the non-linear jump/ramp algorithm in the inner loop controller is activated only while the HEGO sensor is inactive during warm-up, and the outer loop controller provides modulation after warm up of the HEGO sensor. However, it will also be appreciated that the jump/ramp algorithm may alternatively be used to in place of outer loop modulation, for example, in configurations in which the outer loop is not capable of providing modulation.

As shown in FIG. 5, according to another embodiment the modulation source 306 may alternatively include a waveform modulation source 306b configured to output a periodic waveform such as a square wave. Each time the square wave switches polarity, a jump from the proportional control and a ramp from the integrator control in the PI controller are triggered. One difference between this and the above described modulation is that the frequency of the modulation can be directly controlled, for example, making it faster than the natural limit cycle frequency.

Where the waveform generator 306b is configured to be a square wave generator, the following algorithm may be used to generate the square wave.

Square Wave Generator Algorithm:

```
Initialize: Set timer to zero, relay sign = +1.
If timer >= half of the square wave period,
    relay sign = relay sign * −1
    timer = 0
square wave output = square wave magnitude * relay sign.
```

Figure 6:
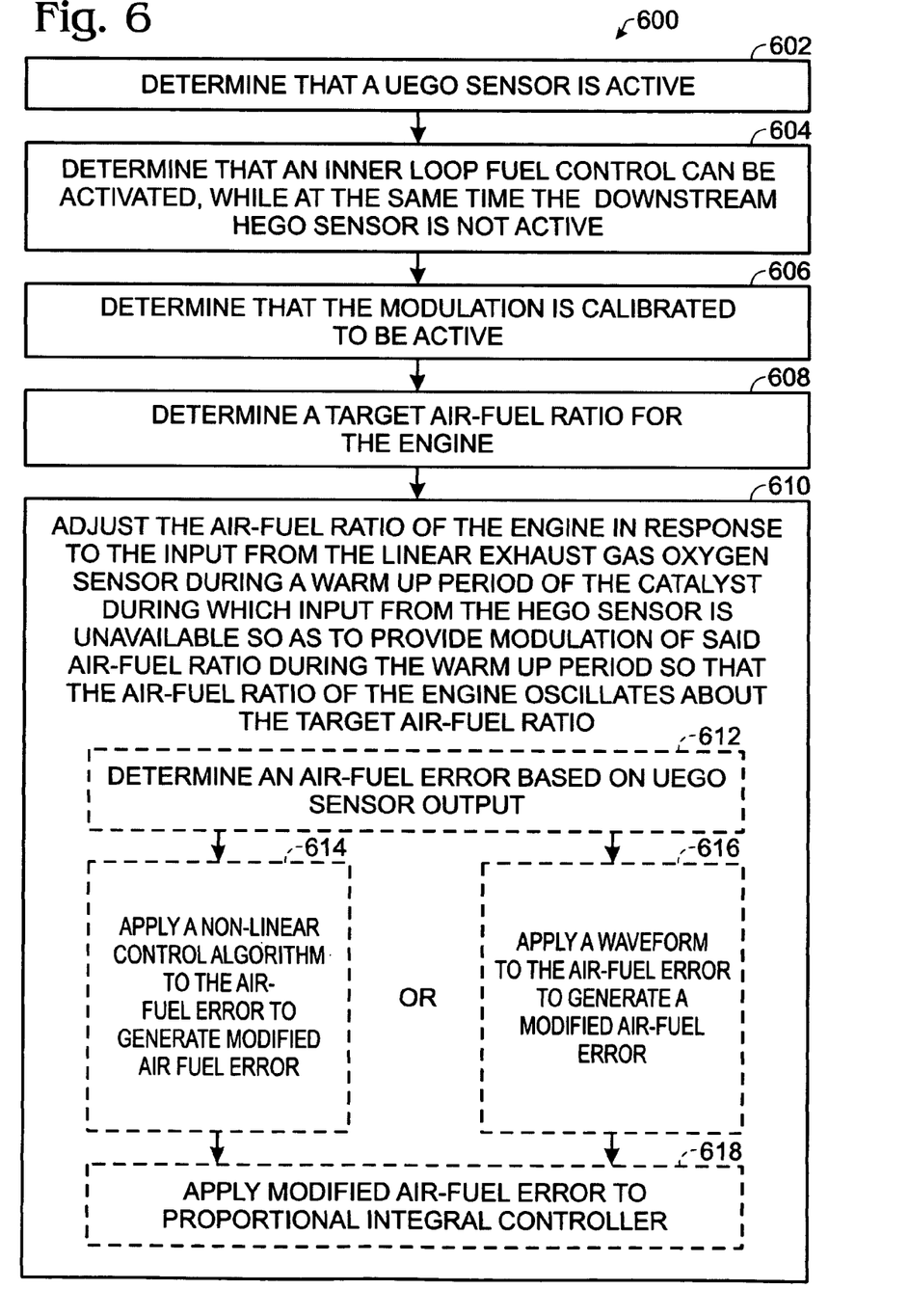
FIG. 6 is a flowchart of a method according to one embodiment of the present invention.

FIG. 6 illustrates an air-fuel ratio control method according to one exemplary embodiment of the present invention. At 602, the method includes determining that a UEGO sensor is active. At 604, the method may include determining that an inner loop fuel control can be activated, while at the same time the downstream HEGO sensor is not active (typically due to warm-up). At 606, the method may include determining that the modulation is calibrated to be active. At 608, the method may include determining a target air-fuel ratio for the engine, typically based on vehicle operating conditions and temperatures.

At 610, the method typically includes adjusting the air-fuel ratio of the engine in response to the input from the linear exhaust gas oxygen sensor during a warm up period of the catalyst during which input from the HEGO sensor is unavailable so as to provide modulation of said air-fuel ratio during the warm up period so that the air-fuel ratio of the engine oscillates about the target air-fuel ratio. As shown at 612, the step of adjusting the air-fuel ratio may be accomplished, at least in part by determining an air-fuel error based on UEGO sensor output.

According to one alternative, the step of adjusting the air-fuel ratio so as to provide modulation may further include applying a non-linear control algorithm to the air-fuel error to generate modified air-fuel error, as shown at 614. To apply the non-linear control, determining the air-fuel error at 612 may be accomplished by determining an observed air-fuel ratio from UEGO sensor output, and subtracting the observed air-fuel ratio from the target air-fuel ratio. Further, the method may include generating a modified air-fuel error by determining whether the air-fuel error is positive, and if so setting the modified air-fuel error to the larger of either the air-fuel error or a calibrated minimum air-fuel error, or else setting the modified air-fuel error to the more negative of either the air-fuel error or the calibrated minimum error multiplied by negative one. It will be appreciated that repeated application of the modified air-fuel error results in modulation of the air-fuel ratio based on the UEGO output.

Alternatively, the step of adjusting the air-fuel ratio so as to provide modulation may further include applying a waveform to the air-fuel error to generate a modified air-fuel error, as shown at 616. A square wave is typically used; however, it will be appreciated that other suitable waveforms may alternatively be employed.

As shown at 618, the method typically further includes applying the modified air-fuel error to a proportional integral controller of an air-fuel controller of the engine. As described above, application of either the non-linear control modulation method or the waveform modulation method causes the proportional integral controller to command an air-fuel ratio that exhibits jump/ramp characteristics and oscillates around a target air-fuel ratio. These jump/ramp command signals are illustrated FIGS. 10 and 13.

According to such a method, the air-fuel ratio may be modulated during engine warm-up based on UEGO feedback, even when HEGO sensor output is unavailable.

Figure 7A:
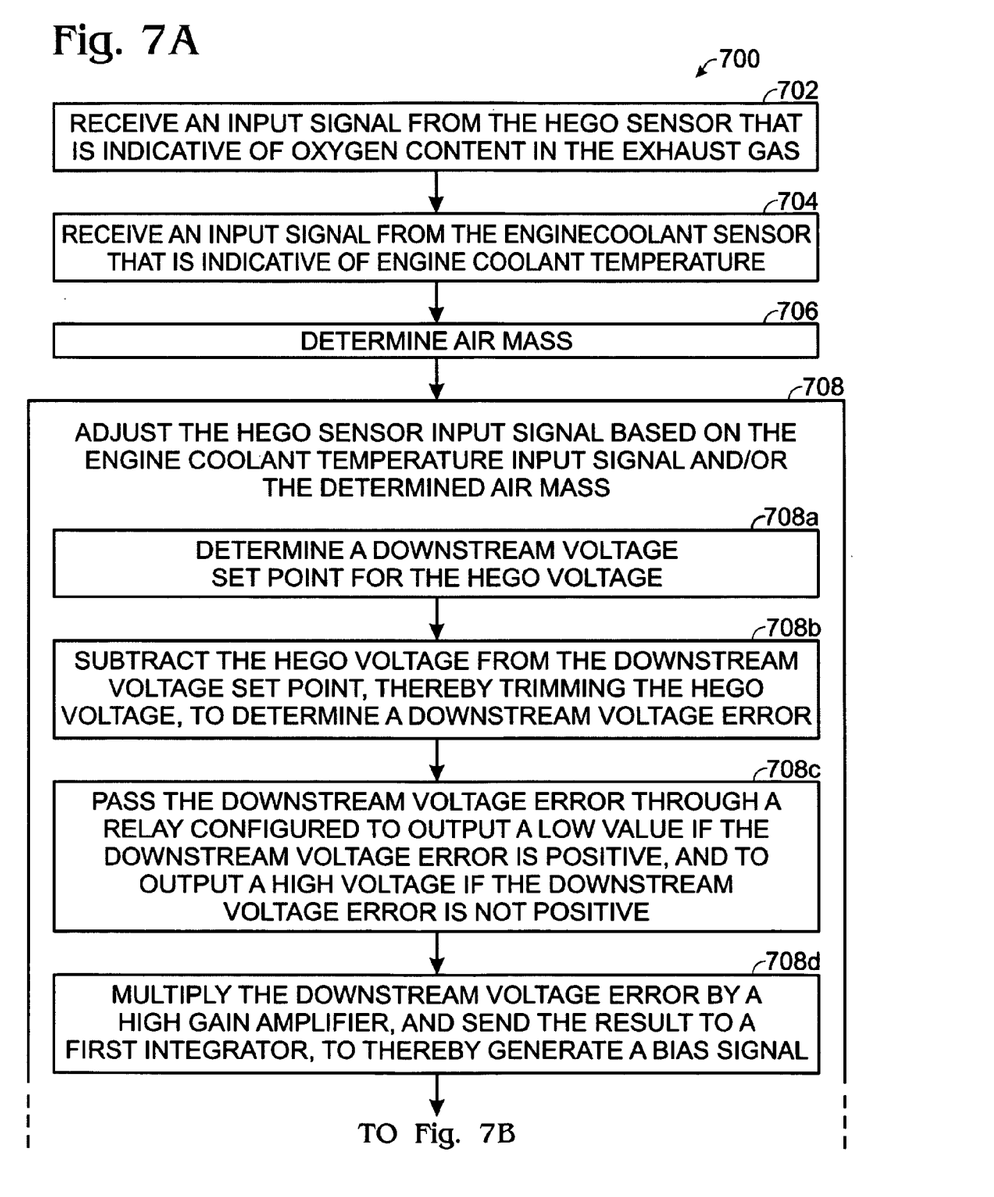
FIGS. 7A and 7B include a flowchart of a method according to another embodiment of the present invention.
Figure 7B:
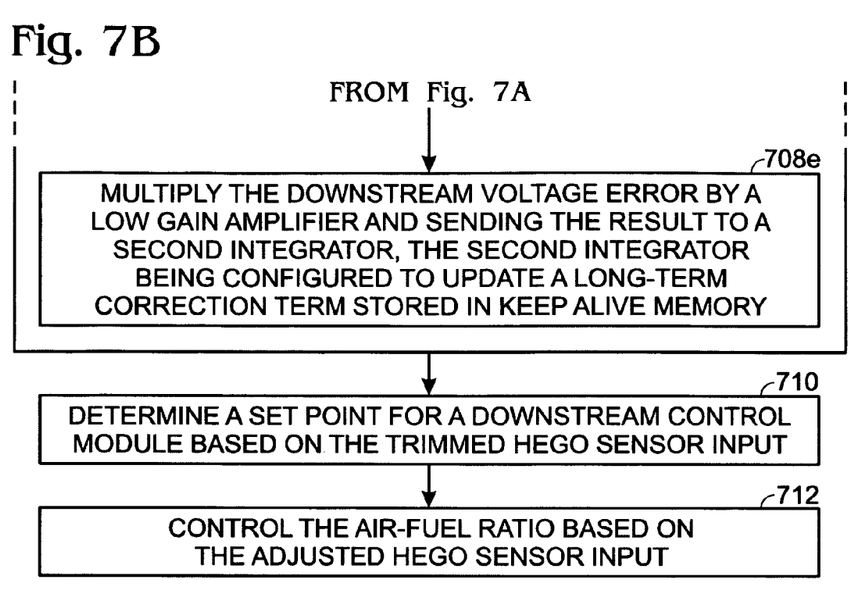

Turning now to FIGS. 7A and 7B, a method 700 for controlling an air fuel ratio in an on-road vehicle according to another embodiment of the invention is illustrated. Typically, the vehicle includes an engine and associated exhaust gas path, the exhaust gas path including a linked linear universal exhaust gas oxygen (UEGO) sensor positioned upstream of a catalyst in the exhaust gas path, and a heated exhaust gas oxygen (HEGO) sensor positioned adjacent the catalyst.

As illustrated at 702, the method typically includes receiving an input signal from the HEGO sensor that is indicative of oxygen content in the exhaust gas. At 704, the method includes receiving an input signal from the engine coolant sensor that is indicative of engine coolant temperature. At 706, the method may also include determining an air mass of the engine.

At 708, the method includes adjusting, typically by trimming, the HEGO sensor input signal based on the temperature input signal and/or the determined air mass. The temperature input signal may be obtained from an engine coolant temperature sensor, an exhaust temperature sensor, other suitable temperature sensor configured to sense a temperature of the engine. The step of adjusting HEGO sensor input may be accomplished by, as indicated at 708a, determining a downstream voltage set point for the HEGO voltage. The downstream voltage set point is typically determined by referencing a look up table that relates a measured engine temperature (such as engine coolant temperature or exhaust temperature) and air mass to a downstream voltage set point. According to another embodiment, the downstream set point is determined by calculating an inferred catalyst temperature as described above, and referencing a look up table that relates an inferred catalyst temperature to a downstream set point. At 708b, the method includes subtracting the HEGO voltage from the downstream voltage set point, thereby trimming the HEGO voltage, to determine a downstream voltage error. At 708c, the method further includes passing the downstream voltage error through a relay configured to output a low value if the downstream voltage error is positive, and to output a high voltage if the downstream voltage error is not positive. At 708d, the method typically includes multiplying the downstream voltage error by a high gain amplifier, and sending the result to a first integrator, to thereby generate a bias signal. At 708e, the method typically includes multiplying the downstream voltage error by a low gain amplifier and sending the result to a second integrator, the second integrator being configured to update a long-term correction term stored in keep alive memory. Typically, steps 708a-708e occur in an outer loop controller as described above, which may be alternatively referred to as an upstream control module since it functions to provide a set point for a downstream control module.

At 710, the method includes determining a set point for an inner loop controller, which may alternatively be referred to as a downstream control module, based on the trimmed HEGO sensor input. Typically, the output of the relay (modified as described above), is combined with the bias signal and long-term correction term to determine the set point. As described above, the inner loop control module is typically configured to receive feedback from the UEGO sensor, and command an air fuel ratio of the engine based on the feedback from the UEGO sensor and the set point. Finally, at 712, the method includes controlling the air-fuel ratio based on the adjusted HEGO sensor input, typically from the inner loop control module.

According to such a method, the air-fuel controller may operate based on a HEGO voltage adjusted based on the measured engine temperature during warm up and early stable operation of the engine, to thereby modify engine output emissions and maximize efficiency of the engine and catalyst system. Thus, the problems associated with the prior art, such as saturation of the catalyst during engine warm up and early stable engine operation, may be inhibited, lowering undesirable emissions as a result.

FIGS. 8-13 illustrate results obtained according to the above described embodiments.

Figure 8:
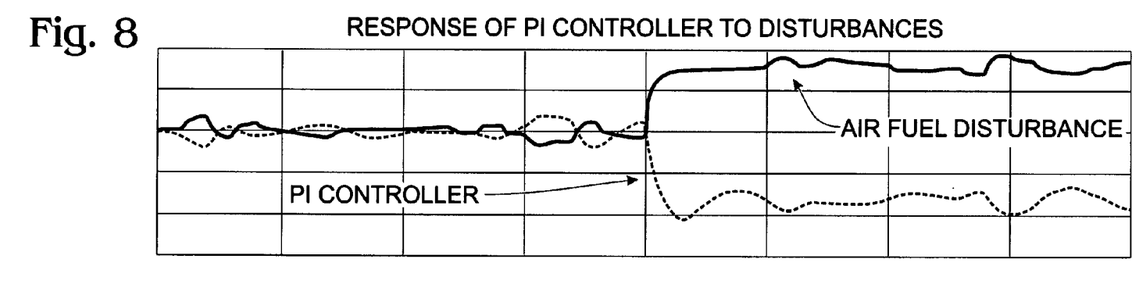
FIG. 8 is a graph illustrating an exemplary response of the PI controller to disturbances in the air-fuel ratio.

FIG. 8 is a graph illustrating an exemplary response of the PI controller to disturbances in the air-fuel ratio.

Figure 9:
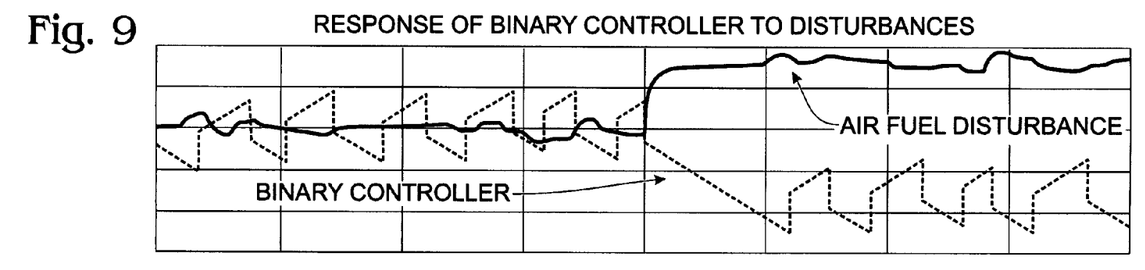
FIG. 9 is a graph illustrating an exemplary response of a binary controller to disturbances in the air-fuel ratio.

FIG. 9 is a graph illustrating an exemplary response of a binary controller to disturbances in the air-fuel ratio.

FIG. 10 is a graph illustrating an exemplary response of a PI controller with non-linear input to disturbances in the air-fuel ratio.

Figure 11:
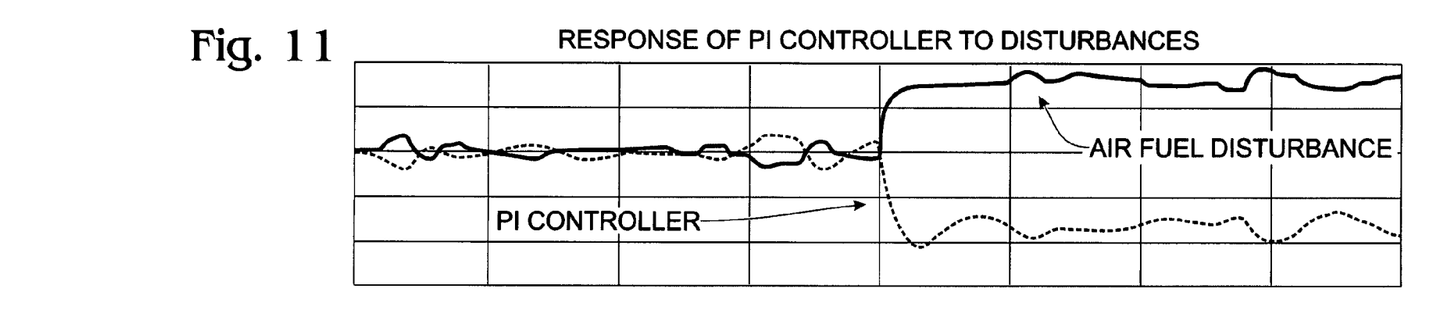
FIG. 11 is a graph illustrating an exemplary response of a PI controller to disturbances in the air-fuel ratio.

FIG. 11 is a graph illustrating an exemplary response of a PI controller to disturbances in the air-fuel ratio.

Figure 12:
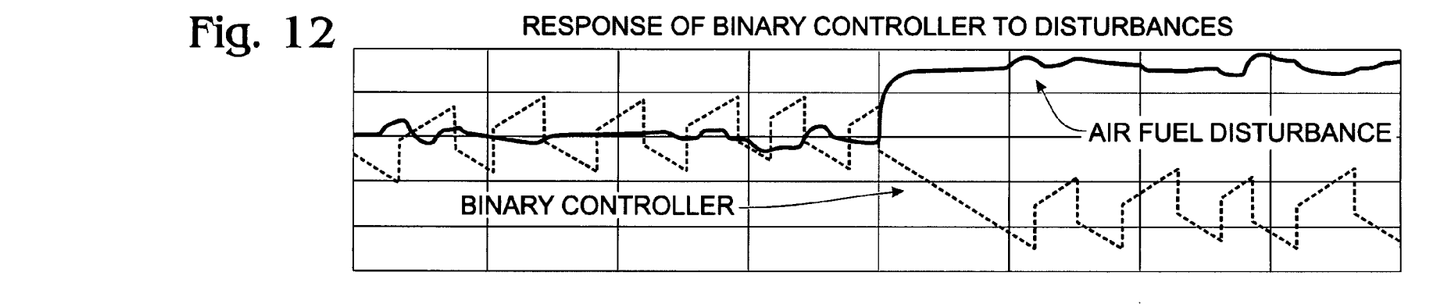
FIG. 12 is a graph illustrating an exemplary response of a binary controller to disturbances in the air-fuel ratio.

FIG. 12 is a graph illustrating an exemplary response of a binary controller to disturbances in the air-fuel ratio.

Figure 13:
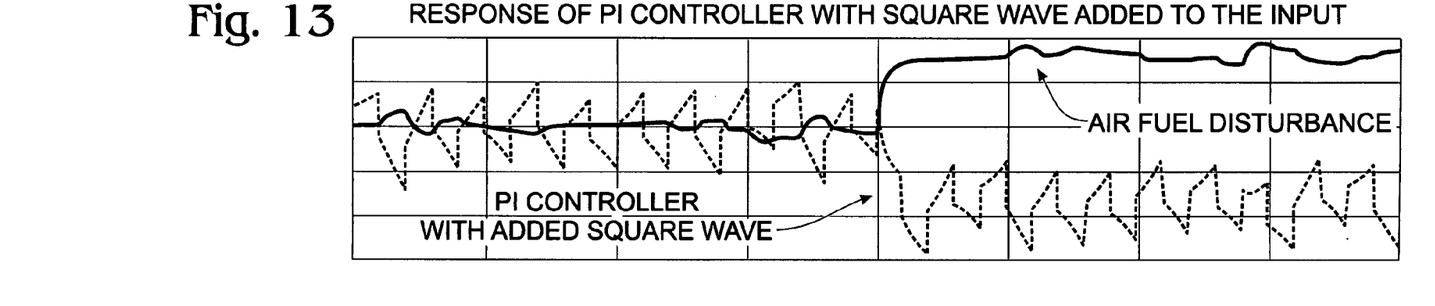
FIG. 13 is a graph illustrating an exemplary response of a PI controller with waveform modulation input to disturbances in the air-fuel ratio.

FIG. 13 is a graph illustrating an exemplary response of a PI controller with waveform modulation input to disturbances in the air-fuel ratio.

It will be appreciated that the configurations and routines disclosed herein are exemplary in nature, and that these specific embodiments are not to be considered in a limiting sense because numerous variations are possible. The subject matter of the present disclosure includes all novel and nonobvious combinations and subcombinations of the various system and exhaust configurations, algorithms, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. An air-fuel ratio control method comprising:
   adjusting an air-fuel ratio of an engine via a modulation source such that the air-fuel ratio modulates in response to input from a UEGO sensor during a warm up period of a catalyst during which input from a HEGO sensor is unavailable; and
   decoupling the modulation source from the UEGO sensor input after warm-up of the HEGO sensor.

2. The method of claim 1, further comprising:
   prior to adjusting the engine air-fuel ratio,
       determining that the UEGO sensor is active;
       determining that an inner loop fuel control can be activated, while at the same time the downstream HEGO sensor is not active; and
       determining that the modulation is calibrated to be active.

3. The method of claim 2, wherein a target air-fuel ratio is determined based on vehicle operating conditions and temperatures.

4. The method of claim 2, wherein adjusting the air-fuel ratio includes adjusting the air-fuel ratio based at least in part on output from the UEGO sensor.

5. The method of claim 4, wherein adjusting the air-fuel ratio includes determining an air-fuel error based on UEGO sensor output.

6. The method of claim 5, wherein determining the air-fuel error is accomplished by determining an observed air-fuel ratio from UEGO sensor output, and subtracting the observed air-fuel ratio from the target air-fuel ratio.

7. The method of claim 6, wherein adjusting the air-fuel ratio further includes generating a modified air-fuel error by determining whether the air-fuel error is positive, and if so setting the modified air-fuel error to the larger of either the air-fuel error or a calibrated minimum air-fuel error, or else setting the modified air-fuel error to the more negative of either the air-fuel error or the calibrated minimum error multiplied by negative one.

8. The method of claim 7, further comprising applying the modified air-fuel error to a proportional integral controller.

9. The method of claim 5, wherein adjusting the air-fuel ratio further includes applying an asymmetric waveform with bias to the air-fuel error to generate a modified air-fuel error.

10. The method of claim 9, wherein the waveform is a square wave.

11. An air-fuel ratio method for an engine with a UEGO upstream of a catalyst and a HEGO downstream of the catalyst, comprising:

during catalyst warm-up and while the HEGO is unavailable and not active:
adjusting an air-fuel ratio of the engine in response to the UEGO;
imposing oscillating modulation of the air-fuel ratio via a modulation source and an air-fuel ratio error signal so that the air-fuel ratio oscillates about a stoichiometric air-fuel ratio; and during a condition other than when the HEGO is unavailable:
decoupling the modulation source from the air-fuel ratio error signal so that the air-fuel ratio does not oscillate in response to the modulation source.

12. The method of claim 11 wherein the oscillating modulation includes a square wave.

13. An emissions control system for an on-road vehicle having an engine and associated exhaust gas path, the system comprising:
a catalyst coupled to the exhaust gas path;
a linear universal exhaust gas oxygen (UEGO) sensor coupled to the exhaust gas path upstream of the catalyst and configured to measure oxygen content in exhaust gas from the engine upstream of the catalyst;
a heated exhaust gas oxygen (HEGO) sensor positioned adjacent the catalyst and configured to measure oxygen content in exhaust gas from the engine; and
a controller coupled to the engine and configured to:
adjust fuel injection in response to the UEGO sensor and an added air-fuel modulation while not responding to the HEGO sensor during a waiin up period of the catalyst during which input from the HEGO sensor is unavailable to oscillate the air-fuel ratio about a target air-fuel ratio, and
adjust fuel injection in response to the UEGO sensor and the HEGO sensor, without the added modulation, after warm-up of the HEGO sensor, to oscillate the air-fuel ratio about the target air-fuel ratio.

14. The system of claim 13, wherein the controller includes an inner loop controller having a modulation source for the air-fuel modulation, wherein the inner loop controller is configured to output a modulation signal for the air-fuel modulation.

15. The system of claim 14, wherein the controller includes an outer loop controller configured to receive an output of the HEGO sensor.

16. The system of claim 14, wherein the inner loop controller is configured to calculate an air-fuel error based on a commanded air-fuel ratio and a feedback signal received from the UEGO sensor.

17. The system of claim 16, wherein the inner loop controller is configured to add the modulation signal to the air-fuel error, and send the result to a proportional integral (PI) controller.

18. The system of claim 17, wherein the modulation signal triggers the PI controller to generate a jump from a proportional control of the PI controller, and a ramp from an integrator in the PI controller, in the commanded air-fuel ratio signal.

19. The system of claim 18, wherein the modulation source is a non-linear input.

20. The system of claim 19, wherein the non-linear input is added to an error term.

21. The system of claim 18, wherein the modulation source is a waveform input.

22. The system of claim 21, wherein the modulation source is a square wave input.

* * * * *